United States Patent [19]

Van Grouw et al.

[11] Patent Number: 4,515,147
[45] Date of Patent: May 7, 1985

[54] CLEAN BURNING GRATE FOR FIREPLACES AND WOOD STOVES

[76] Inventors: Samuel J. Van Grouw, 1142 Blythe St., Foster City, Calif. 94404; Richard D. Smith, 2415 S. Court, Palo Alto, Calif. 94301

[21] Appl. No.: 572,986

[22] Filed: Jan. 23, 1984

[51] Int. Cl.³ .............................................. F23H 1/02
[52] U.S. Cl. ................................. 126/163 R; 126/164
[58] Field of Search .................. 126/120, 121, 163 R, 126/163 A, 164, 165, 143; 237/51, 55

[56] References Cited

U.S. PATENT DOCUMENTS

| 1,585,449 | 5/1926 | Welsh | 126/132 |
| 1,908,854 | 5/1933 | Little | 126/163 R |
| 3,269,383 | 8/1966 | Maasberg | 126/163 R |
| 3,942,509 | 3/1976 | Sasser | 126/164 |
| 4,091,794 | 5/1978 | Stites | 126/121 |
| 4,122,825 | 10/1978 | Slate | 126/164 |
| 4,342,306 | 8/1982 | Thulman et al. | 126/163 R |
| 4,350,139 | 9/1982 | Robichaud | 126/163 R |
| 4,440,146 | 4/1984 | Audino et al. | 126/163 R |

FOREIGN PATENT DOCUMENTS

| 2398265 | 3/1979 | France | 126/163 R |
| 1469632 | 4/1977 | United Kingdom | 126/121 |

Primary Examiner—James C. Yeung

[57] ABSTRACT

An improved grate and method for burning solid fuel having a support for the fuel, a fan, a multiplicity of preheated air jets uniformly distributed across the entire area of the grate and directed through the support generally upwardly into the lower burning surface of the solid fuel, and a trough for collecting a layer of glowing coals located immediately below the jets and in close proximity to the burning lower surface of the solid fuel. The grate provides the cleanest burning and lowest fuel consumption occurs when only one layer of solid fuel is placed on the grate.

15 Claims, 6 Drawing Figures

CLEAN BURNING GRATE FOR FIREPLACES AND WOOD STOVES

TECHNICAL FIELD

The present invention is directed to an improved grate for burning solid fuel cleanly and efficiently. The grate may be used in a fireplace or in a conventional wood stove.

BACKGROUND OF THE INVENTION

Air pollution due to solid fuel burning has become critical in many parts of the country. Certain ski areas have serious air pollution problems because their locations in valleys or bowls in the mountain prevent natural ventilation. The air pollution is generated by both fireplaces and wood stoves. Fireplaces are usually located in the accommodations for skiers and are burned for aesthetic reasons; wood stoves are usually located in the homes of the local population and are burned to provide heat. Air pollution has become so bad in some areas that fireplace burning has been restricted and limitations have been placed on new fireplace construction.

Pollution is caused because fireplaces and wood stoves do not burn all of the fuel vapor escaping from the burning wood and these fuel vapors are transported up the chimney into the atmosphere. For clean combustion, thorough mixing of the air and fuel vapor is required to achieve intimate contact between oxygen and fuel molecules. In addition, the mixture must be at a temperature high enough to cause the reaction to occur and sufficient time must be available to allow the reaction to go to completion. The reaction rate increases exponentially with increasing temperature so it is highly desirable to have high temperatures to complete the reactions in the shortest time possible before the reactants have escaped from the hot combustion zone of the fire and have been cooled below their ignition temperature by dilution with excess air or heat transfer to the surroundings.

Existing fireplaces and stoves use natural draft to bring oxygen to the burning surfaces of the wood as well as to cause mixing of the fuel vapor and oxygen in the combustion zone. Natural draft forces result from the buoyancy of heated air or combustion gas, bringing new air to the combustion zone. Unfortunately, these buoyant forces are extremely weak (normally less than 0.01 inches of water gage (IWG)) and result in very low velocities and turbulence levels over the burning surface. These low velocities limit the rate at which combustion can occur on the burning surface of the wood and also limit the mixing of the volatile fuel vapor with the combustion air. Because of the limited combustion rate on the wood surface and limited combustion of the volatiles in the combustion zone, temperatures in the combustion zone are usually too low to allow complete combustion of the fuel vapors before they escape from the combustion zone and cooled still further.

A further problem arises because of the coupling of the fire with the natural draft. Wood in a fireplace or stove does not burn with uniform intensity over its entire surface but rather has zones where it burns with high intensity and zones where very little combustion occurs. The zones with high intensity create the most buoyant forces and hence, the most intense local draft. The hottest part of the fire tends to become even hotter. Unfortunately, the cooler part of the fire, which badly needs a stronger draft to burn hotter and cleaner, is unable to generate that draft so it tends to cool further and pollute more. Near the end of a fireplace fire, when the hottest zones of the fire have all burned out, little draft is left to burn the smoldering logs yet remaining and to prevent large quantities of unburned volatiles from escaping into the atmosphere.

Measurements taken in an open fireplace indicate that the combustion zone in which adequate combustion temperatures may be achieved is localized to within a few inches of the burning wood and often is found only in the interstices between logs where the radiated heat from the burning surface is retained in a cavity. Fireplaces burn with large amounts of excess air (2000% excess air was measured in one test) that dilute and cool the combustion gas below combustion temperature shortly after it leaves the surface of the wood. Temperatures measured twelve inches above the fire in a fireplace are approximately 200° F., well below the nominal 1000° F. needed to initiate the combustion reactions. Hence, for fireplaces, the only opportunity to achieve clean combustion by burning the volatile vapors exists while the vapors are in the combustion zone, immediately adjacent to the surface of the wood.

Airtight wood stoves do not have the problem of large amounts of excess air cooling the combustion gas, as do fireplaces; however, they do transfer significant amounts of heat from the combustion zone of the fire directly to the cooler walls of the firebox. They also operate with natural draft forces and are subject to the same difficulties of low combustion rates on the surface of the wood, poor mixing of the volatiles with the air and non-uniform combustion conditions, all of which reduces temperatures in the combustion zone and limits their ability to burn the fuel vapors completely. Wood stoves have the additional problem that the combustion air is limited in order to control the combustion rate of the stove and heat losses up the chimney. Limited air means that the ability of the fuel vapor molecule to find an oxygen molecule is also limited, further preventing complete combustion of the fuel vapor. This situation is exacerbated when the airflow of a stove is significantly reduced to produce a slow burn, at which times the stove becomes a much greater source of pollution.

One approach to improved combustion is found in Maasberg (U.S. Pat. No. 3,269,383) which teaches a fireplace grate comprised of two perforate andiron tubes used to support the ends of logs in a fireplace. He provides a forced draft adjacent the ends of the logs to facilitate the initial kindling of the log fire and, if desired, to maintain combustion of the logs. Maasberg does not teach the provision of a uniform supply of forced air into the entire lower surface of the burning logs or the maintenance of a combustion zone provided by a bed of hot coals adjacent to the lower surface of the burning logs.

Similarly, Alexander and Haynes, in French Pat. No. 2,398,265, teach a grate with hollow bars, the central ones of which have orifices to produce jets of air to provide augmented combustion near the center of the fire, in the manner of a blacksmiths forge. They do not teach the provision of a uniform supply of forced air across the entire lower surface of the burning logs. In fact, their design only serves to intensify the burning rate at the center of the fire, already hot, while providing no augmentation near the periphery of the fire which is the coolest and pollutes greater. In addition, Alexander and Haynes do not teach any provision for maintaining a combustion zone of hot coals in close proximity to the bottom surface of the burning logs.

SUMMARY OF THE INVENTION

The subject invention substantially overcomes the above problems by creating a high temperature combustion zone with highly turbulent mixing across the entire lower surface of the burning logs. It accomplishes this by providing a forced flow of preheated air uniformly distributed across the entire lower surface of the logs and by maintaining troughs of glowing coals in close proximity to the bottom surface of the logs. The combustion zone is largely limited to this area adjacent to the grate by eliminating a second layer of logs piled above the logs resting on the grate.

Because of the high temperatures and turbulent mixing created by the improved grate of the present invention, volatile fuel vapors are burned to completion before they escape the combustion zone and before there is any chance that their reaction will be quenched by rapid cooling to below the combustion temperature. The high temperatures combustion zone is located in troughs between the bottom surfaces of the burning logs and the upper surfaces of the bed of glowing coals and the side walls of the grate supports. The glowing coals are held in close proximity to the bottom of the log by the improved grate. Radiant heat transfer varies as the square of the distance between the two surfaces. The closer the surfaces, the more intense the heat transfer between these two surfaces and the fewer the losses from edge effects.

The primary objective of the present invention is to reduce the pollution from wood burning fireplaces by 30% to 50%. It also offers the benefits of easy starting, better aesthetics from the fire, near maintenance free operation of the fire, reduction in the consumption of wood by eliminating the need for a second layer of wood on the fire, burning all logs completely to the end of the fire and burning damp wood or difficult species of wood easily. Radiant heat into the room is increased because of the hotter fire. The fan consumes less than 30 watts in normal operation.

The present invention may be carried out, in one form, by providing an improved grate comprising a plurality of substantially parallel, spaced, hollow solid fuel supports each being provided with a multiplicity of orifices extending therethrough, the orifices being directed to the lower surface of the supported solid fuel. Additionally, between the solid fuel supports there is provided a plurality of substantially parallel glowing coals supports which together with the side walls of the solid fuel supports define combustion zone troughs. A fan and manifold, connected to the hollow solid fuel supports moves air to and through them.

These and other features and advantages of the present invention will become more apparent upon a perusal of the following description wherein similar characters of reference refer to similar parts in each of the several views.

DETAILED DESCRIPTION OF THE PREFERRED EMBODIMENT

Figure 1:
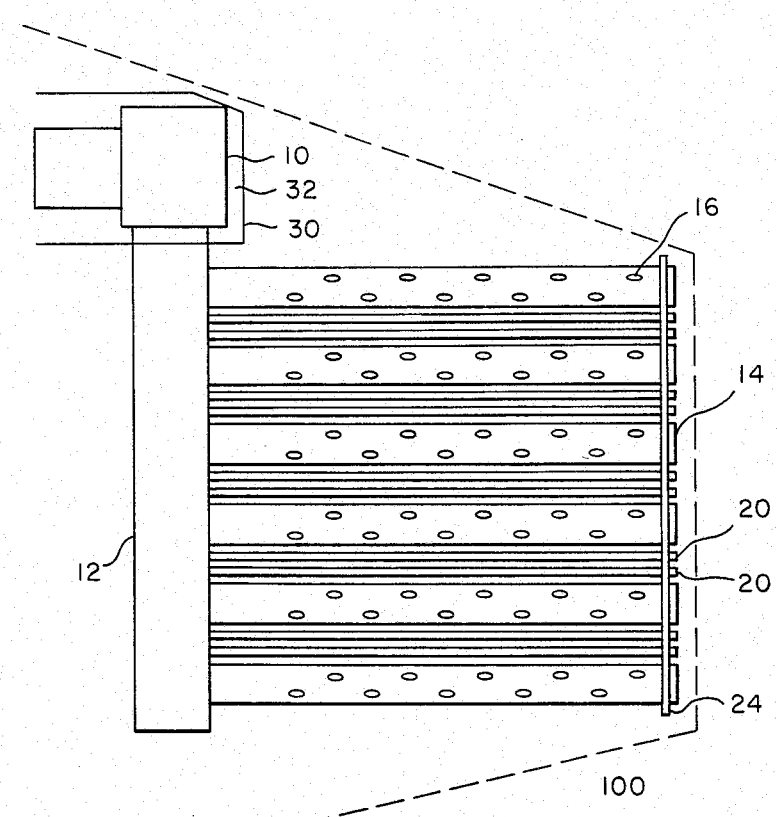
FIG. 1 is a top view of the Clean Burning Grate showing its mounting in a conventional fireplace.
Figure 2:
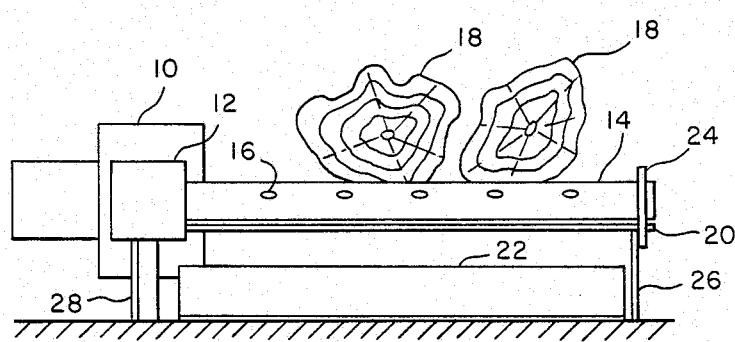
FIG. 2 is a side elevational view of the Clean Burning Grate illustrating two logs on the grate.
Figure 3:
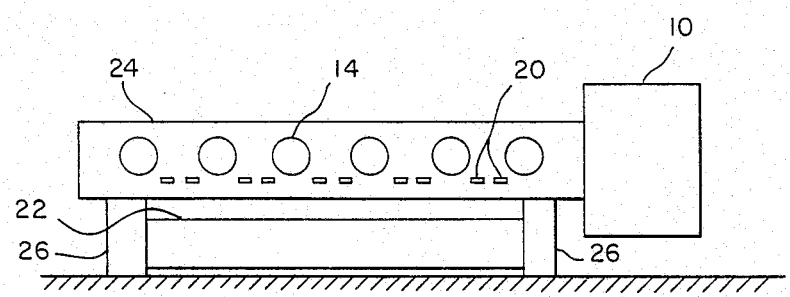
FIG. 3 is a rear elevational view of the Clean Burning Grate.
Figure 4:
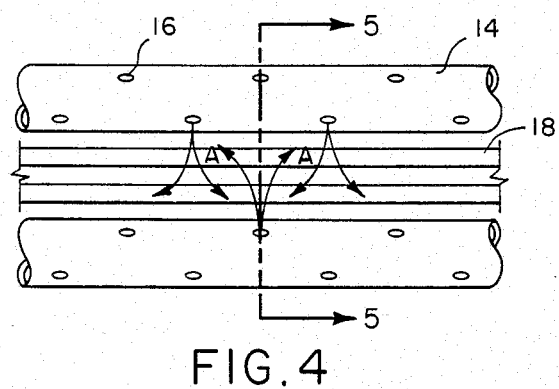
FIG. 4 is a partial top view showing the relationship of the orifices and the air flow pattern created thereby.
Figure 5:
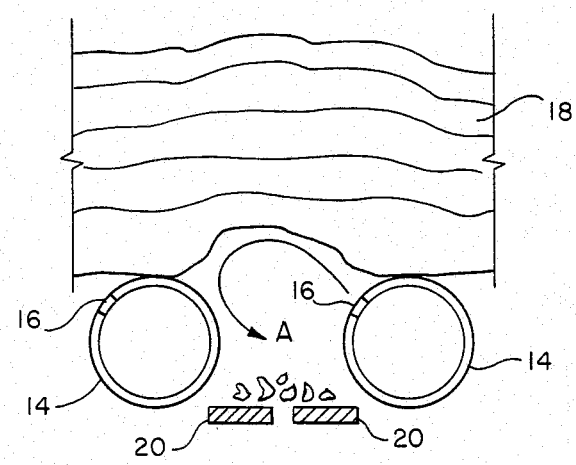
FIG. 5 is a sectional view taken substantially along line 5—5 of FIG. 4 showing the air flow pattern.

Turning now to the drawings, there is illustrated in FIG. 1 to 5 a blower 10 which supplies air at low pressure in the range from about 0.1 to 1.0 inches of water gage (IWG) to manifold 12 and thence to a multiplicity of hollow grate bars 14. At nominal conditions the blower supplies air in the range from 6 to 10 SCFM of air to a small fireplace. The air passes through the hollow grate bars and is heated from 500° F. to 1000° F. by the hot walls of the grate bars. The heated air issues from a multiplicity of orifices 16 producing jets of heated air directed at the undersurface of the logs 18 resting on the grate bars. As illustrated in FIG. 1, the orifices 16 are spaced over the entire area of the grate. The orifices are preferably 5/32 inch in diameter, drilled at a preferred angle of 45° to the vertical. The orifices should be larger than 3/32 inch and smaller than ⅜ inch in diameter and should be oriented from 0° to 60° from the vertical. The hole pattern is staggered between grate bars to assure an optimum flow of preheated air over the undersurface of the log and to establish a turbulent air flow pattern as indicated by the arrows A in FIGS. 4 and 5. Air jets are generally directed upward but preferably with an adequate horizontal component to provide a sweeping flow of air over the majority of the lower surfaces of the wood.

Hot glowing coals are retained between the grate bars in intimate contact with the lower surface of the logs by means of coals retaining strips 20. The glowing coals reside in the trough 21 between adjacent grate bars, where they provide the lower hot surface for the combustion zone as well as heat the grate bars, which in turn preheat the incoming air. Thus, to the maximum extent possible, the heat of the fire is focused into the high temperature combustion zone. Passageways between adjacent coals retaining strips as well as passageways between coals retaining strips 20 and grate bars 14 allow ash and spent coals to drop into the ash pan 22 when their size has been reduced to approximately ⅜ inch diameter. Thus, an intense combustion zone is located between the upper surface of the bed of coals and the lower surface of the logs. This zone exists uniformly over the entire area of the grate. Radiation is trapped between the hot combustion surface of the log and the glowing surface of the coals. Into this area air preheated to 500° F. to 1000° F. is injected to provide oxygen and turbulence to burn fuel volatiles. The jets produce cavities in the lower surfaces of the burning logs which may grow to several inches in diameter and act to further trap radiant heat. The cavities themselves become excellent local combustion devices because they act as black bodies, trapping radiation from the burning surface. Temperatures of over 1700° F. are routinely measured in the combustion zone; temperatures over 2000° F. have been measured in the cavities. The elevated temperature, high turbulence and abundant supply of preheated air provide excellent combustion conditions, and burn fuel volatiles quickly.

The air manifold is a 2×2 inch hollow square tube made of mild steel. All hot parts comprising the grate bars 14, coals retaining strips 20, back structural support 24, back legs 26 and front legs 28 are made from 304 stainless steel to resist oxidation at elevated temperatures above 1000° F., ensuring long life for the Clean Burning Grate. The ash pan 22 is made from mild steel with surface protection which is adequate to prevent oxidation as its peak temperature is well below that of the grate.

The individual elements of the grate are subjected to uneven temperatures during start up, shut down and in normal operation. To prevent these uneven temperatures from causing thermal stresses within the grate, special design features are incorporated. The two outer grate bars 14 will always operate the coolest and they are welded to the back structural support 24. The remaining grate bars rest in holes in the back structural support and are each free to move in and out as required. All of the coals retaining strips rest in rectangular openings in the back structural support and are also free to individually move back and forth. All grate bars and coals retaining strips are welded to the manifold.

The dashed line 100 in FIG. 1 represents the outline of the interior of a fireplace in which the Clean Burning Grate is mounted. The entire grate including fan and its motor are mounted within the fireplace for minimum intrusion on the aesthetics of the fireplace. The fan is hidden behind the opened fireplace screen. The fan and fan motor are protected from radiation and convection from the fire by the heat shield 30 and cooled by the flow of air drawn over its inner surface during normal operation. The air inlet to the fan 32 is located adjacent to the innermost wall of the heat shield.

For easy starting and quick ignition when new logs are added to the fire, the fan has a high speed setting. Under normal operation, the fan produces 0.1 IWG but for starting and quick ignition it produces 0.2 to 0.6 IWG. This large amount of air at high jet velocities produces high burning rates and provides a fully lighted fire within three minutes from a cold start. Thus, compared to conventional wood fires with a natural draft, the Clean Burning Grate provides much easier starting, always a problem when building a wood fire.

When burning a wood fire in a fireplace, the desired result is to obtain a pleasant appearance and provide a cheery radiant warmth to the room in which the fireplace is located. Because of the hotter fire which exists with the Clean Burning Grate, these effects are achieved with only one log or two logs on the fire rather than the three or more necessary to maintain a conventional fire. Wood is saved because only one or two logs are required on the fire rather than three, but this savings is partially offset by the faster burning rate of the logs due to better combustion conditions. In one test, the Clean Burning Grate burned for 90 minutes with two logs and a conventional grate burned for 125 minutes with three logs, resulting in wood savings of 8% for the same burning time of the fireplace.

A conventional fire of three or more logs burns longer than a fire on the Clean Burning Grate but the quality of the fire degrades markedly during the last portion of the fire into largely smoking logs with very little flame. This is the portion of a conventional fire where major amounts of volatile emissions are emitted. The fire on a Clean Burning Grate has a shorter overall burning time but is pleasing to view throughout its entire burning cycle. It also eliminates the higher pollution at the end of the burn cycle.

Another feature of the Clean Burning Grate is its ability to burn large logs well. Once a bed of coals has been established in the grate, the grate will easily burn the largest log that can be conveniently placed in the fireplace. Burning large logs is an advantage because it reduces the work of the wood cutter.

Yet another advantage of the Clean Burning Grate in the fireplace is that the fire is relatively maintenance free. In a normal fire, manipulation of the wood is frequently necessary to maintain a cheery fire because of the low temperatures of the combustion zone and hence marginal conditions for good combustion. The Clean Burning Grate provides excellent burning conditions that are easily maintained. Further, these excellent burning conditions are maintained on the bottom of the log whereby fresh wood is automatically fed into the burning zone by gravity.

If all of the combustion in the wood fire were to occur in the combustion zone between the bottom surfaces of the logs and the coals on the grate, combustion of the volatiles would be nearly complete. Unfortunately, wood fires are made from random shaped logs and the hot gases sweep around the outside of the logs on the way to the chimney. Consequently, the sides and upper surfaces of the logs are heated enough to emit volatiles which are often not burned because they are too cool. Hence, the subject invention does not produce an exhaust that is pollution-free, but does represent a reduction in pollution of 30% to 50% compared to a conventional grate. The pollution from heated upper surfaces of the logs is minimized if only one layer of logs is placed on the grate. Logs burning in the second layer would not benefit in any way from the high temperature combustion zone adjacent to the grate and hence would produce significant pollution.

Figure 6:
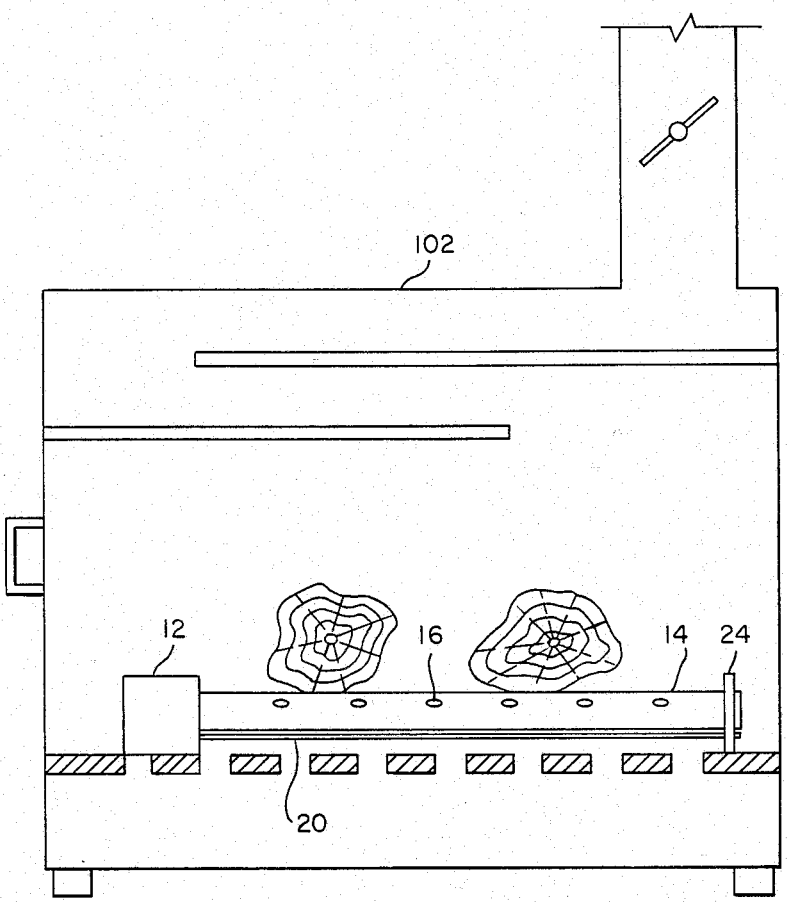
FIG. 6 is a side elevational sectional drawing of a wood stove showing the Clean Burning Grate mounted therein.

FIG. 6 shows the Clean Burning Grate 1 mounted in a conventional wood stove 102. The Clean Burning Grate can be retrofitted into existing wood stoves or incorporated into the design of new wood stoves. For a wood stove application, all of the conventional primary air inlets to the stove are shut off and primary air is only supplied through the grate. The output of the stove is controlled by the air supplied by the blower through controlling the speed of the blower. In a wood stove, control of the intensity of the fire can be completely controlled by the action of the grate. This is not possible in a fireplace because the fire in a fireplace is completely exposed to the ambient air.

The major advantage of the Clean Burning Grate in a wood stove is to reduce pollution and provide more efficient combustion, especially at low outputs. Increased burning efficiency in a wood stove can be directly related to increased heat release per pound of wood consumed, a measure not meaningful for fireplace use.

What is claimed is:

1. An improved grate for the efficient burning of solid fuel, said grate comprising a plurality of substantially parallel, hollow first support members defining a first generally planar surface for supporting the lower surface of solid fuel, a plurality of substantially parallel second support members defining a second generally planar support surface located below said first surface, said second support members being located between alternate ones of said first support members and defining, in combination with said first support members, a plurality of troughs for supporting glowing coals, a multiplicity of orifices extending through each of said first support members, each orifice being directed toward said first planar surface for creating a zone of turbulence in one of said troughs beneath the lower surface of the solid fuel, and means for moving air to and through said orifices.

2. The improved grate as defined in claim 1 wherein said means for moving air to and through said orifices comprises a fan and a manifold, said manifold being connected at one end to said fan for receiving air therefrom and being connected to said first support members for delivering air thereto.

3. The improved grate as defined in claim 2 wherein said second support members comprise spaced bars through which ashes may fall.

4. The improved grate as defined in claim 2 further comprising means for retaining said first support members in said first planar orientation and said second support members is said second planar orientation.

5. The improved grate as defined in claim 4 wherein said means for retaining comprises said manifold, to which one end of each of said first support members is permanently secured, and a structural support for carrying the opposite end of each of said first support members.

6. The improved grate as defined in claim 5 comprising at least three first support members, wherein the opposite end of each of the outer members is permanently secured to said structural support and the opposite end of each of the central members is free to move during expansion and contraction thereof.

7. The improved grate as defined in claim 4 wherein said means for retaining comprises said manifold, to which one end of each of said second support members is permanently secured, and a structural support for carrying the opposite end of each of said second support members for free movement during expansion and contraction thereof.

8. The improved grate as defined in claim 2 wherein said fan is capable of being operated at various speeds whereby the rate of combustion of the fire may be controlled.

9. The improved grate as defined in claim 8 wherein said fan provides an outlet air pressure between 0.05 and 0.20 inches of water gage (IWG) for sustained operation and provides an outlet air pressure between 0.2 and 1.0 IWG for quick starting and log reignition.

10. The improved grate as defined in claim 1 wherein said orifices are disposed in each of said first support members on opposite sides of a vertical plane passing through the center of each of said first support members.

11. The improved grate as defined in claim 10 wherein said orifices of adjacent ones of said first support members are staggered relative to one another, whereby a zone of turbulent air may be established in said trough.

12. The improved grate as defined in claim 1 wherein said orifices are disposed at an angle in the range from 0° to 60° from the vertical.

13. The improved grate as defined in claim 1 wherein said orifices have a diameter larger than 3/32 inch and smaller than ⅜ inch.

14. The improved grate as defined in claim 1 wherein said first support members and said second support members are made of stainless steel.

15. The improved grate as defined in claim 14 wherein the stainless steel is AISI 304.

* * * * *